(12) United States Patent
Ballard et al.

(10) Patent No.: US 8,701,574 B2
(45) Date of Patent: Apr. 22, 2014

(54) METHOD AND APPARATUS FOR APPLYING A MINIMUM FLOW OF ANHYDROUS AMMONIA AT TARGETED RATES DUE TO LIMITATIONS EXISTING IN CURRENT DISTRIBUTION/DELIVERY

(75) Inventors: Jeff Ballard, Sioux Falls, SD (US); Steve S. Jensen, Sioux Falls, SD (US); Noel A. Person, Sioux Falls, SD (US); Warren L. Thompson, Baltic, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 248 days.

(21) Appl. No.: 13/214,389

(22) Filed: Aug. 22, 2011

(65) Prior Publication Data

US 2012/0216732 A1 Aug. 30, 2012

Related U.S. Application Data

(60) Provisional application No. 61/376,016, filed on Aug. 23, 2010.

(51) Int. Cl.
*A01C 23/04* (2006.01)
*A01C 23/02* (2006.01)

(52) U.S. Cl.
USPC ......................................................... 111/119

(58) Field of Classification Search
USPC ......... 111/119, 118, 11; 137/486, 487, 487.5, 137/485, 78.1, 78.2; 239/155, 63; 222/1; 73/861.77, 861.76, 204.18, 204.19, 73/204.15, 204.16
See application file for complete search history.

(56) References Cited

U.S. PATENT DOCUMENTS 6,422,162 B1 * 7/2002 Nimberger et al. ........... 111/119

FOREIGN PATENT DOCUMENTS

CA 2750205 A1 2/2012

* cited by examiner

*Primary Examiner* — Christopher J Novosad
(74) *Attorney, Agent, or Firm* — Schwegman, Lundberg & Woessner, P.A.

(57) ABSTRACT

The invention provides an apparatus and method for enabling at least a minimum pressure and flow rate of stored NH3 from a storage tank to knives for injection into soil, regardless of ambient temperature. A pressure sensor and control valve monitors the pressure of the NH3 flow. If the sensed pressure drops below a desired minimum, e.g., 0.5 psi, a controller drives the control valve to open and also signals ramping up of a boost pump. The boost pump pumps NH3 from the storage tank to ensure maintenance of a minimum flow rate and pressure of NH3 from the tank to the soil. The pump runs on-demand only as needed, thereby reducing power requirements when the pump is not needed to supplement NH3 tank pressure.

8 Claims, 2 Drawing Sheets

METHOD AND APPARATUS FOR APPLYING A MINIMUM FLOW OF ANHYDROUS AMMONIA AT TARGETED RATES DUE TO LIMITATIONS EXISTING IN CURRENT DISTRIBUTION/DELIVERY

CROSS-REFERENCE TO RELATED APPLICATIONS

The present application claims priority under 35 U.S.C. §119(e) to provisional application No. 61/376,016, filed on Aug. 23, 2010 and entitled BOOST PUMP SYSTEM FOR ANHYDROUS AMMONIA APPLICATION.

BACKGROUND OF THE INVENTION

1. Field of the Invention

The present invention relates to apparatus and methods for application of a targeted minimum flow of NH3 on agricultural fields. More particularly, a boost pump is used to assist in transferring at least a minimum pressure and flow rate of NH3 from storage tank to tool bar when ambient temperature is too cold or delivery systems are deficient for the NH3 to flow at the minimum flow rate without assistance.

2. Description of the Related Art

It is well known in the art to apply anhydrous ammonia ("NH3") to the soil to increase its nitrogen content. NH3 application systems typically include a tractor which pulls a tool bar or similar implement or mover for cutting into the soil. Generally, in this arrangement, a small trailer with a storage tank containing NH3 is pulled behind the tool bar. Hosing connections are typically made between the storage tank and the tool bar through which NH3 flows ultimately to knives mounted on the tool bar. The knives are used to inject the NH3 below the surface of the soil.

These known systems and methods take advantage of the fact that NH3 expands nearly 100 times its stored volume when vaporized or in its gaseous state. Thus, if the ambient temperature is sufficiently high to move the temperature of the stored NH3 above its vaporization temperature of −28 degrees F., at least some of the NH3 in the storage tank vaporizes at its vaporization temperature, generating pressure within the tank. This pressure is used to force the vaporized NH3 through the hosing to the knives. After the NH3 is injected into the soil, the NH3 is covered with soil to aid in retention of the injected NH3 by reducing loss of NH3 by evaporation.

Several problems occur with known NH3 application devices. The root of most of these problems is that the systems rely on the ambient temperature being sufficiently high to pressurize the NH3 in the tank to flow out of tank by vaporizing at least some of the stored NH3. In other words, the ambient temperature must be sufficiently high in order to maintain a sufficient amount of the stored NH3 above its vaporization temperature to create sufficient pressure within the storage tank so that the NH3 is urged out of the tank to the knives for injection into the soil. If the ambient temperature is too low, too much of the stored NH3 will be below its vaporization temperature, thus remaining in liquid form, and an insufficient amount of stored NH3 will vaporize. Accordingly, the pressure in the storage tank will be insufficient to force the stored NH3 out of the storage tank, through the hoses to the knives mounted on the tool bar and, ultimately, into the soil.

This problem can result in a simple inability to apply targeted amounts of NH3 in, e.g., fall or winter seasons at economically feasible methods. Alternatively, a small amount of NH3 may be applied if the ambient temperature is at a level where some vaporization of stored NH3 occurs, albeit at an insufficient and/or perhaps variable level wherein the resulting pressure moves between providing sufficient flow rates of NH3 and insufficient, or no, flow rates of NH3. This will obviously result in non-uniform coverage and application of NH3 to the soil.

The art fails to adequately provide a mechanism or method that enables at least a minimum flow of NH3 from the storage tank to the soil, regardless of ambient temperature conditions.

The present invention overcomes these deficiencies.

BRIEF SUMMARY OF THE INVENTION

The invention provides an apparatus and method for enabling at least a minimum pressure and flow rate of stored NH3 from a storage tank to knives for injection into soil, regardless of ambient temperature. A pressure sensor and control logic monitors the pressure of the NH3 flow. If the sensed pressure drops below a desired minimum, e.g., 0.5 psi, a controller drives the control valve to open and also signals ramping up of a boost pump. The boost pump pumps NH3 from the storage tank to ensure maintenance of a minimum flow rate and pressure of NH3 from the tank to the soil. The pump runs on-demand only as needed, thereby reducing power requirements when the pump is not needed to supplement NH3 tank pressure.

The figures and the detailed description that follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

Figure 1:
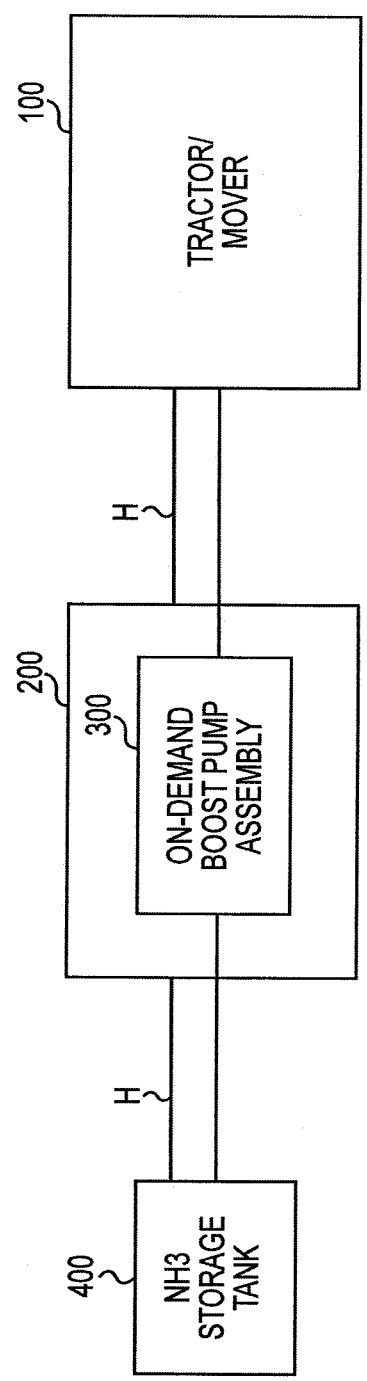
FIG. 1 is a block diagram of one embodiment of the present invention.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

Generally, the present invention provides an apparatus and method for enabling at least a minimum pressure and flow rate of stored NH3 from a storage tank for uniform injection, at a minimum pressure and resulting flow rate into soil, regardless of ambient temperature.

FIG. 1 is a block diagram of one embodiment of the present invention. A tractor or other mover or tow vehicle 100 is shown in operative connection with both the toolbar frame 200 and in operative connection and fluid communication with the on-demand boost pump assembly 300. The toolbar frame 200 is further in operative connection with the NH3 storage tank 400, which is in operative connection and fluid communication with the on-demand boost pump assembly 300. On-demand boost pump assembly 300 is illustrated as operationally mounted on toolbar frame 200. Alternative mounting positions are within the scope of this invention, though mounting of assembly 300 on toolbar frame 200 is the preferred embodiment. As the skilled artisan will readily understand, the toolbar frame 200 and the NH3 storage tank 400 are supported by wheels for rolling motion when pulled by the tractor 100. The NH3 storage tank 400 will be connected to the toolbar frame by a hitching assembly H and the toolbar frame 200 will, in turn, be connected to the tractor by a hitching assembly H as is well known in the art.

Figure 2:
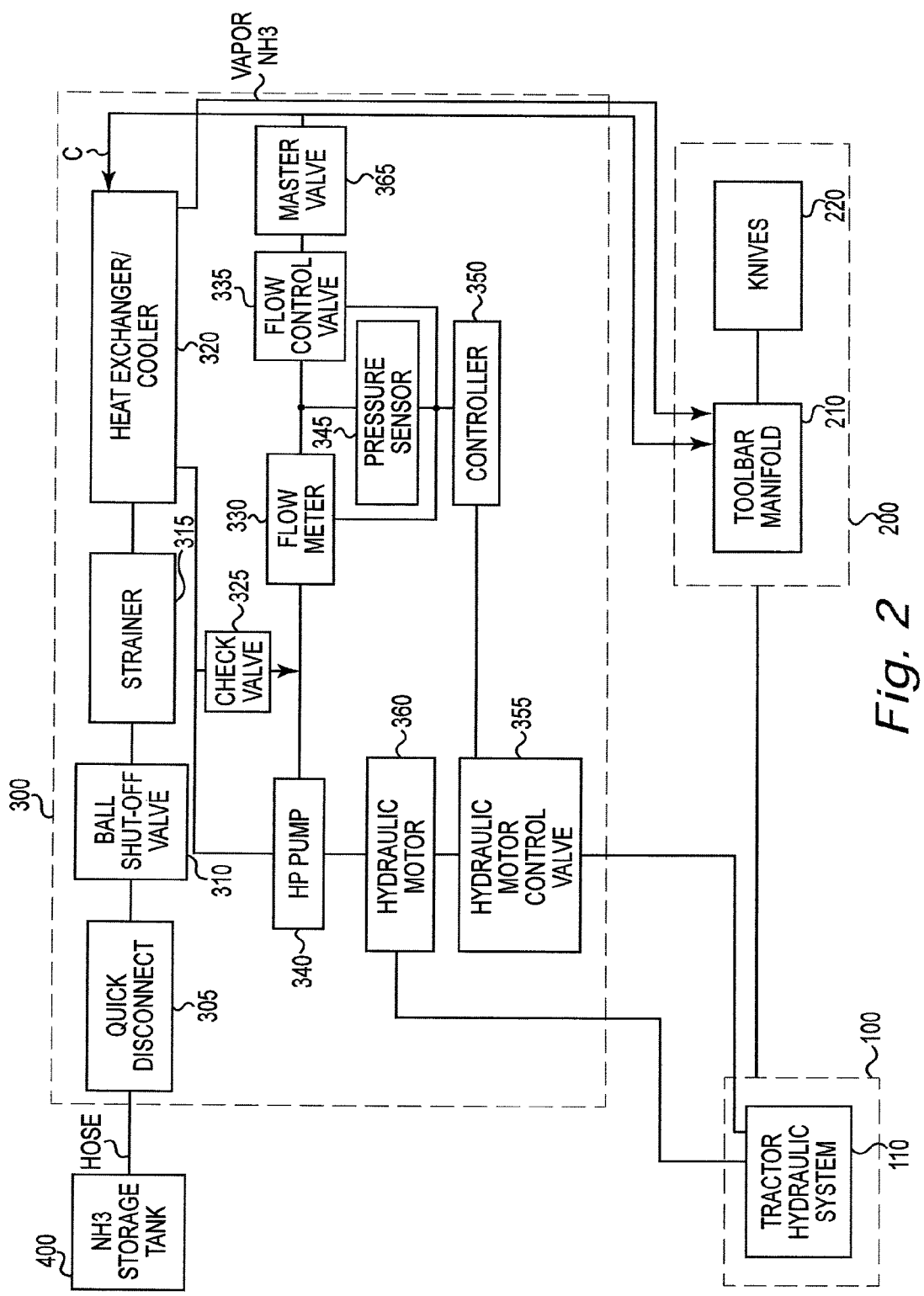
FIG. 2 is a block diagram of one embodiment of the present invention.

Turning now to FIG. 2, the on-demand boost pump assembly 300 is shown in exploded block diagram view.

The NH3 Storage Tank 400 is in fluid communication, via hosing, with the on-demand boost pump assembly 300 as illustrated with a quick disconnect mechanism and flow hosing that are well known in the art. The quick disconnect 305 and hosing are in fluid communication with an emergency shut-off ball valve 310 and strainer 315. The NH3 in the storage tank 400, when under sufficiently high pressure, flows outward through the hosing, shut-off ball valve 310 and strainer 315 to the heat exchanger or cooler 3320 as is commonly known in the art. The NH3 is cooled and converted from vapor back to liquid in the heat exchanger 320 so it may be accurately measured and metered.

Thus, liquid NH3 flows out of the heat exchanger/cooler 320 and, assuming the pressure in the NH3 storage tank 400 is adequate, continues through a check valve 325 then on to the flow meter 330 and to the flow control valve 335. At this point, the on-demand pump 340 is not running and, as a result, the pump 340 is not assisting the NH3 flow. A pressure sensor 345 is located between the flow meter 330 and flow control valve 335 and monitors the pressure of the flowing NH3 at a point proximate the flow control valve 335. The measured or sensed pressure signal at the pressure sensor 345 is provided to a controller 350 that is in operative connection and communication with the flow meter 330, pressure sensor 345 and flow control valve 335. The controller 350 reads the pressure sensor signal signaled to controller 350 by pressure sensor 345 and compares the pressure sensor signal against a desired minimum pressure stored within controller 345. Controller 345, as is well known in the art, comprises a processor and a memory in operative communication with the processor. The processor is capable of receiving the pressure sensor signal, comparing the received pressure sensor signal with at least one desired minimum pressure value which may be stored within the processor or within the memory. The processor is further capable of being programmed to signal the flow control valve 335 and/or the hydraulic motor control valve 355 for controlling the hydraulic motor 360, as further detailed infra, depending on the results of the comparison of the received pressure sensor signal with the at least one desired minimum pressure value.

If the pressure sensor signal sent to controller 350 from pressure sensor 345 indicates that pressure is above the desired minimum pressure, e.g., and without limitation 0.5 psi, then the controller 350 signals the flow control valve 335 to achieve an open state. Generally, the controller 350 may signal the flow control valve 335 to open completely, close completely or any variant therebetween in order to maintain the flow of NH3 at the target flow needed to achieve sufficient coverage. Such target coverage is informed by the desired target rate per acre, the width of the toolbar/coverage of the knives, and speed of the movement of the moving implement. Accordingly, if the pressure of flowing NH3 sensed by the pressure sensor 345 and signaled to the controller 350 is above the desired minimum pressure, the controller 350 drives the flow control valve 335 to an open state sufficient to enable meeting the target flow rate of NH3 through the assembly and, ultimately, to the injection knives mounted on toolbar frame 200 as indicated by.

Thus, NH3 continues to flow at the target flow rate through the open flow control valve 335 to a master valve 365, which allows most of the NH3 to flow therethrough to the toolbar manifold 210 where the NH3 is distributed to a plurality of knives 220 mounted along the toolbar manifold 210 and toolbar frame 200. From the knives 220, the NH3 is injected into the soil in known manner. A small portion of the flowing NH3 is diverted after the master valve 365, sending this small portion of NH3 back to the heat exchanger/cooler 320, as indicated by the arrow labeled "C" from master valve 365 and heat exchanger/cooler 320, where the liquid NH3 is converted back to vapor, providing a cooling function for the gaseous NH3 moving from the storage tank 400 through the system to the heat exchanger/cooler as described above. This vapor is then delivered to the toolbar manifold 210 and knives 220 for injection into the soil as indicated by the line labeled "vapor NH3".

Alternatively, where the pressure sensor signal is read by the controller 350 to be below the desired minimum pressure, the controller 350, in operative connection and communication with the hydraulic motor control valve 355, signals the hydraulic motor control valve 355 to start the hydraulic motor 360 and ramp up the HP pump 340 to provide on-demand supplementing of the NH3 flowing from the storage tank 400. The hydraulic motor control valve 355 and hydraulic motor 360 are in operative fluid communication with the tractor hydraulic system 110. The hydraulic motor 360 is in operative communication with the hydraulic pump 340 which is, in turn, in fluid communication with the heat exchanger/cooler 320, strainer 315, emergency shut off ball valve 310, and ultimately the NH3 storage tank 400. Thus, driving the hydraulic pump 340 results in pulling additional NH3 from storage tank 400 to supplement the flowing NH3 from storage tank 400 in order to meet the flow rate and coverage demands. The hydraulic pump 340 is driven by the controller 350, via the hydraulic motor control valve 355, to provide sufficient NH3 to the system in order to meet the target flow rate at the pressure sensor 345 and, ultimately, knives 220. If the pressure sensor 345 senses pressure that is lower than the target flow rate, the controller 350 signals the hydraulic motor control valve 355 to increase the speed of the hydraulic motor 360 and, concomitantly, the hydraulic pump 340, in turn, drawing additional NH3 from the storage tank 400 into the system and ultimately at knives 220. If the pressure sensor 345 then senses the pressure is adequate to meet the target flow rate, the hydraulic motor 360 and pump 340 speed is maintained by controller 350. However, if the pressure sensor 345 determines that the pressure is higher than needed to meet the target flow rate, the controller 350 signals the hydraulic motor control valve 355 to decrease the speed of the hydraulic motor 360 to the point at which the pressure at the pressure sensor 345 is adequate to meet the target flow rate.

Thus, the boost hydraulic pump 340 pumps supplemental NH3 from the storage tank 400 to ensure maintenance of a minimum flow rate and pressure of NH3 from the tank 400 to the knives 220 for injection into the soil. The pump 340 runs on-demand only as needed, and only at the speed needed, thereby reducing power requirements when the pump 340 is not needed to supplement NH3 tank pressure. In addition, this system and method ensures a continuous flow rate of NH3 and, therefore, a continuous and consistent coverage of NH3 in the soil over time.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A method for maintaining a desired preselected pressure in an anhydrous ammonia application system, comprising:
   providing a storage tank at least partially filled with anhydrous ammonia;
   providing a flow system for the anhydrous ammonia to flow under pressure from the storage tank to a toolbar having a manifold and a plurality of injection knives on the manifold, wherein the knives inject the anhydrous ammonia into soil;
   monitoring the pressure of the flowing anhydrous ammonia within the flow system;
   comparing the pressure with a preselected minimum flow pressure;
   supplementing the anhydrous ammonia flow with a hydraulic motor in operative communication with a hydraulic pump, the hydraulic pump in fluid communication with the storage tank, in response to the pressure of the flowing anhydrous ammonia within the flow system being below the preselected minimum flow pressure; and
   ensuring the pressure of the flowing anhydrous ammonia within the flow system is maintained at least at the preselected minimum flow pressure.

2. The method of claim 1, further comprising providing a pressure sensor for monitoring the pressure of the flowing anhydrous ammonia within the flow system.

3. The method of claim 2, further comprising:
   providing a controller having a processor, the controller in operative communication with the pressure sensor;
   providing a hydraulic motor control valve in operative communication with the controller and operative and fluid communication with the hydraulic motor; and
   signaling the controller from the pressure sensor the monitored pressure, wherein the controller receives the signaled monitored pressure from the pressure sensor and compares the signaled monitored pressure with a minimum pressure value stored therein.

4. The method of claim 3, further comprising determining the signaled stored monitored pressure is equal to the minimum pressure value.

5. The method of claim 3, further comprising
   determining the signaled stored monitored pressure is less than the minimum pressure value; and
   signaling the hydraulic motor valve by the controller to initiate the hydraulic motor to ramp up the hydraulic pump to supplement the flow of anhydrous ammonia to match the minimum pressure value.

6. The method of claim 5, further comprising monitoring the pressure of the supplemented flow of anhydrous ammonia at the pressure sensor;
   determining the monitored pressure to be above the minimum pressure value;
   signaling the hydraulic motor valve by the controller to slow down the hydraulic motor and hydraulic pump to match the minimum pressure value.

7. An apparatus for injecting anhydrous ammonia into soil, comprising:
   a toolbar frame having a manifold and injection knives, wherein the toolbar frame is adapted for pulling behind a tractor;
   a storage tank at least partially filled with anhydrous ammonia and under an internal pressure whereby the anhydrous ammonia flows out of the storage tank in response to the storage tank internal pressure to the toolbar frame manifold and injection knives, the storage tank adapted for hitched pulling behind the toolbar frame;
   a pressure sensor, a flow meter and a flow control valve mounted on the toolbar frame and in operative fluid communication with the storage tank and wherein the pressure sensor, flow meter and flow control valve are in operative fluid communication;
   a controller mounted on the toolbar frame and in operative communication with the pressure sensor, control valve and flow meter;
   a hydraulic pump mounted on the toolbar frame and in fluid communication with the storage tank;
   a hydraulic motor for driving the hydraulic pump when initiated;
   a hydraulic motor control valve in operative communication with the hydraulic motor and the controller, wherein the hydraulic motor control valve is adapted to receive a signal from the controller and to signal the hydraulic motor to perform one of starting the hydraulic pump, speeding up the hydraulic pump, slowing the hydraulic pump or stopping the hydraulic pump to supplement the internal pressure of the storage tank to continue the flow of anhydrous ammonia from the storage tank to the toolbar frame's manifold and injection knives.

8. A method for providing a minimum constant pressure and flow rate for anhydrous ammonia injection into soil, comprising:
   providing a storage tank at least partially filled with anhydrous ammonia;
   providing a pressure sensor, a flow meter and a flow control valve in operative fluid communication with the storage tank and wherein the pressure sensor, flow meter and flow control valve are in operative fluid communication;
   providing a hydraulic pump, capable of being driven by a hydraulic motor, the hydraulic motor operatively communicating with a hydraulic motor control valve;
   providing a controller in operative communication with the flow meter, pressure sensor, flow control valve and hydraulic motor control valve;
   flowing anhydrous ammonia from the storage tank to the flow meter, control valve and pressure sensor;
   sensing the pressure of the flowing anhydrous ammonia with the pressure sensor and obtaining a pressure reading;
   providing the sensed pressure reading to the controller, wherein the controller comprises at least one minimum pressure value;
   comparing, in the controller, the sensed pressure reading with the at least one minimum pressure value;
   determining, with the controller, whether the sensed pressure is greater than, less than, or equal to the at least one minimum pressure value;
   signaling, with the controller, the hydraulic motor control valve if the sensed pressure is determined to be less than the at least one minimum pressure value;
   actuating the hydraulic motor with the hydraulic motor control valve to start the hydraulic pump; and
   supplementing the flow of anhydrous ammonia with the hydraulic pump until the sensed pressure is at least equal to the at least one minimum pressure value.

* * * * *

UNITED STATES PATENT AND TRADEMARK OFFICE
CERTIFICATE OF CORRECTION

PATENT NO. : 8,701,574 B2  
APPLICATION NO. : 13/214389  
DATED : April 22, 2014  
INVENTOR(S) : Ballard et al.

Page 1 of 1

It is certified that error appears in the above-identified patent and that said Letters Patent is hereby corrected as shown below:

In the Claims

In column 5, line 8, in Claim 1, before "preselected", delete "desired", therefor In column 5, line 48, in Claim 5, after "comprising", insert --:--, therefor In column 5, line 59, in Claim 6, after "value;", insert --and--, therefor In column 6, line 19, in Claim 7, after "initiated;", insert --and--, therefor Signed and Sealed this  
Second Day of December, 2014

Michelle K. Lee  
*Deputy Director of the United States Patent and Trademark Office*